Nov. 25, 1924.
G. N. HEIN
SUNSHADE
Filed Sept. 25, 1923
1,516,854
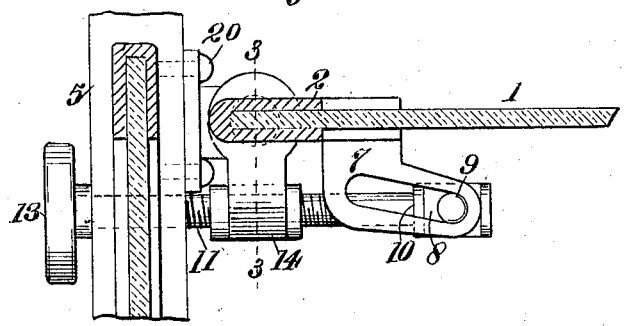
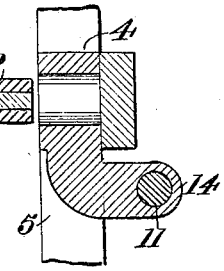
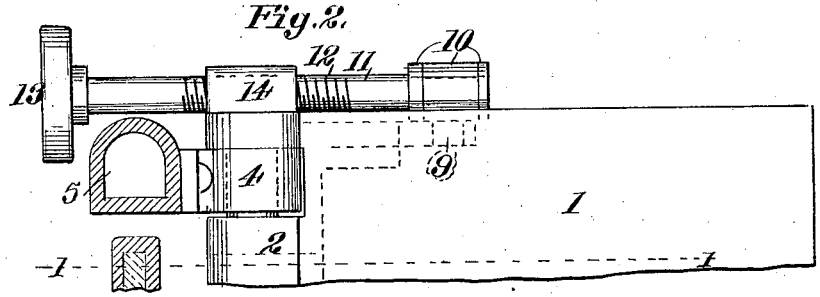
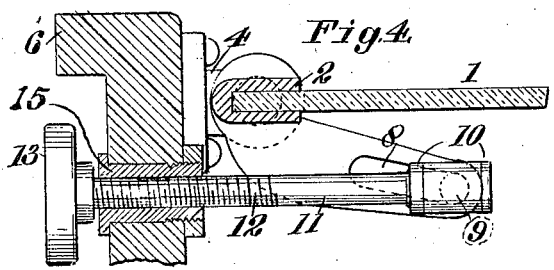
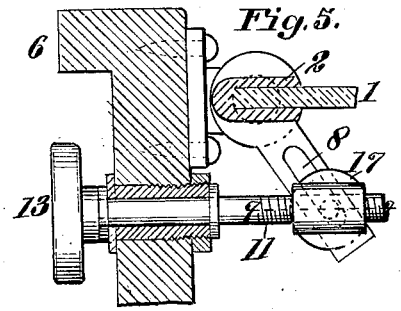
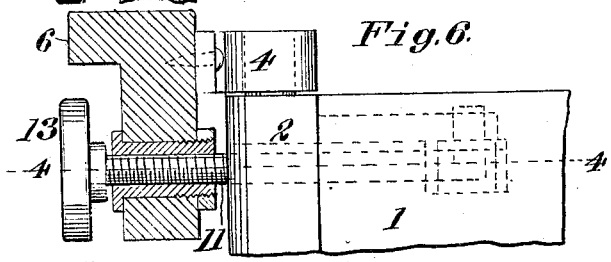
Inventor.
George N. Hein
By Eckert & Totten
attorneys.

Patented Nov. 25, 1924.

1,516,854

UNITED STATES PATENT OFFICE.

GEORGE N. HEIN, OF SAN FRANCISCO, CALIFORNIA.

SUNSHADE.

Application filed September 25, 1923. Serial No. 664,704.

*To all whom it may concern:*

Be it known that I, GEORGE N. HEIN, a citizen of the United States, residing at the city and county of San Francisco and State of California, have invented certain new and useful Improvements in Sunshades, of which the following is a specification.

This invention relates to adjusting means for sunshades or visors which are designed to project outwardly in advance of a motor vehicle windshield.

The object of this invention is the production of an operating mechanism capable of adjusting and maintaining the visor in any desired position; to provide a mounting and adjusting structure which is associated as a unit structure with the visor and which is adapted for attachment at but little expense and with but little effort to a suitable support preferably the standards of a vehicle windshield.

A further object is to provide a structure including essentially an attaching device for mounting a sunshade visor to a support, and to which is pivotally connected one edge of the visor, there being associated with the bracket a rotatable shaft mounted within a bearing to rotate on a fixed axis, the shaft being geared to the pivoted sunshade by means of a slotted guide enabling angular adjustment of the sunshade on rotation being imparted to the shaft.

In the drawings forming a part of this invention:—

Fig. 1 is a detail sectional view of one embodiment of my invention taken on line 1—1 of Fig. 2.

Fig. 2 is a view in top plan of the disclosures in Fig. 1.

Fig. 3 is a sectional view on line 3—3 of Fig. 1.

Fig. 4 is a view similar to Fig. 1 but with the shaft bearings illustrated as being anchored in a support.

Fig. 5 is a view similar to Fig. 4 with the shaft bearing anchored in a support and in which structure the shaft is held from longitudinal movement.

Fig. 6 is a top plan view of the construction illustrated in Fig. 4.

Fig. 7 is a sectional view on line 7—7 of Fig. 5.

Referring particularly to the drawings wherein like characters of reference designate corresponding parts, 1 indicates a conventional form of sunshade carried by a frame 2, which frame is illustrated as fulcrumed at its opposite ends into supporting brackets 4, one of which is attached or secured in any suitable manner, either to the windshield uprights or standards 5 of an open car construction, or to the top supporting portions 6 of a closed car model.

From the frame 2 of each sunshade preferably at its end, although the same may be located centrally of its length if desired, extends an angularly disposed arm 7 formed with a guide slot 8. Co-operating with each guide slot is a pin 9 swivelled, in the disclosure shown in Figs. 1, 2, 4 and 6 between the collars 10, at the outer end of a rotatably mounted shaft 11. The shaft 11 is substantially horizontally disposed, and is threaded for a portion of its length as at 12, and on its inner end carries a handgrip portion 13.

In Figs. 1, 2 and 3 a bearing arm 14 depends from the member 4, and the same is enlarged at its lower end to provide a threaded opening for receiving the threaded portion 12 of the shaft 11 which affords a bearing therefor. In Fig. 4 an interiorly threaded tubular member 15 in an opening in a suitable support receives the threaded portion of the shaft 11, in both disclosures the shaft being capable of longitudinal movement when it is adjusted.

In Figs. 1 to 4 inclusive and Fig. 6, it will be observed that the shaft is axially rotatable on a fixed axis, and its axial rotation imparts longitudinal movement thereto causing the member 9 to move within the slot 8 and impart an angular movement to the sunshade 1. In each of these constructions, it will be observed that the sunshade is maintained in its adjusted position solely by friction between the various parts of the adjusting mechanism and between the threaded shaft 11 and its threaded bearing. In Fig. 5, the shaft 11 is illustrated as passing through a non-threaded bearing 16 and held from longitudinal movement therein by collars 17. The outer end of the shaft in this installation, as in Fig. 7, mounts a threaded follower 18, laterally from which projects a member 19 corresponding to the member 9, and said member is received in the slot 8 in the shield arm.

The structure illustrated in Figs. 1 and 2, it will be observed, is what may be termed a self-contained or package installation, and that is, all of the parts are assembled ready for the device to be attached to a support by securing the brackets 4 to the support by any suitable mechanism as for example the attaching devices 20. The constructions illustrated in Figs. 4, 5 and 6, it will be observed, require mountings for the bearing members 15 and 16 thereof, but other than this particular installation work, the disclosures are the same and operate in the same general manner.

Having thus described my invention, what I claim as new and desire to protect by Letters Patent of the United States is:—

1. In combination with a sunshade, for projecting angularly in advance of a vehicle windshield, a pair of attaching brackets to which the sunshade is pivotally connected at one edge to swing on a horizontal axis, a threaded bearing in one bracket, a threaded shaft rotatable within the bearing, and a slidable connection between the shaft and the sunshade structure.

2. In combination with a sunshade, projecting angularly in advance of a vehicle windshield, a pair of attaching brackets to which the sunshade is pivotally connected at one edge to swing on a horizontal axis, an arm extended below the one of the attaching brackets and having a threaded bore, a threaded shaft rotatable within the threaded bore, and a slidable universal joint connection between the rotatable shaft and the sunshade structure.

3. In combination with a sunshade pivotally mounted to swing on a horizontal axis and provided with a slotted arm extending therefrom, a threaded operating shaft disposed at substantially right angles to the pivotal axis of the sunshade and provided with a hand-grip, a bearing within which the same rotates on a fixed axis, and a direct universal joint connection between the shaft and slotted guide whereby the sunshade is adjusted on its fulcrum by the axial rotation of the shaft.

In testimony whereof I have signed my name to this specification.

GEORGE N. HEIN.